Patented June 9, 1953

2,641,537

UNITED STATES PATENT OFFICE 2,641,537

PRODUCTION OF SALT BRINE

Joseph Avery Dunn and Horace W. Diamond, St. Clair, Mich., assignors, by mesne assignments, to Diamond Crystal Salt Co., St. Clair, Mich., a corporation of Michigan No Drawing. Application October 28, 1946, Serial No. 706,087

3 Claims. (Cl. 23—311)

This invention relates to the production of sodium chloride brine and more particularly of pure brine of uniform saturated concentration.

The use of salt brine is widespread in many fields of industry and in the home as well. Salt brines are used for refrigeration, washing, cleaning, pickling, curing and similar purposes in industries such as meat packing, the fish industry, canning fruits and vegetables, curing and tanning hides, etc. Other industrial applications of salt brine are found, for example, in finishing and dyeing textile fabrics, in soap making, in cleaning steel ingot molds, and so on.

On the other hand, large volumes of soft water are required in many industrial processes such as laundering and also for general use as public water supply in municipalities, large institutions such as factories, schools, hospitals and the like, etc. The same need for soft water exists on a smaller scale in individual homes. Zeolites are commonly used to soften water for such purposes, and these zeolites are regenerated from time to time by salt brine.

When such applications of salt brine are considered collectively, various requirements of a satisfactory brine supply become apparent. For example, with the exception of small home water softeners, a continuously available supply of brine should be maintained to be drawn upon as needed. Usually salt dissolving systems are employed in which water is simply percolated through a bed of coarse rock salt, the salt bed being replenished as needed and the flow of water being regulated according to the amount of brine withdrawn.

Also the brine in most cases should be substantially pure, i. e., it should be a pure solution of sodium chloride not contaminated by the presence of insoluble impurities and/or soluble impurities such as calcium and magnesium chlorides, calcium and sodium sulfates, etc., such as are found in natural salt deposits, rock salt and the like. Such impurities are objectionable in the treatment of food products; in industrial processes where the impurities may cause undesirable chemical reactions; in the regeneration of zeolites where the impurities may interfere with the efficiency of the regeneration; etc. Furthermore insoluble impurities form sludge deposits in the salt dissolving apparatus which interfere with its operation so that it needs to be shut down and cleaned from time to time.

In addition, brine of substantially uniform and saturated salt concentration is generally required. Uniformity of concentration is necessary wherever the use of the brine depends on physical or chemical characteristics that are affected by variations in salt concentration, and saturated brine is highly desirable if not necessary in the interest both of uniformity and maximum efficiency. In the case of zeolites, for example, regeneration requires that calcium and the like absorbed by the zeolite from the hard water during the softening operation shall be displaced by sodium from the salt brine. It is well known that the efficiency of this regeneration falls off very rapidly whenever the concentration of salt in the brine falls substantially below the saturation point.

In making brine for such purposes, it is very desirable from the standpoint of purity to use refined evaporated salt such as is obtained through crystallization of salt by evaporation of aqueous solutions in well known commercial processes. Such salt, as produced in large quantities under ordinary commercial operating conditions, is as high as 99.95% pure sodium chloride and its insoluble content is less than ten parts per million. Further it is very free from metallic contamination, the copper and iron content being less than one part per million. Thus when brine is made by dissolving such salt in clean, pure water, the solute is practically pure sodium chloride and the brine is free of insoluble matter.

However, the use of refined evaporated salt does not satisfy the other requirements stated above. The great majority of evaporated salt is produced in the form of relatively fine granules or particles. Thorough agitation of such salt in water will produce a saturated brine, but the care and attention as well as the equipment and labor required to make brine in this way render it impractical for use in industrial operations. On the other hand, a bed formed of the relatively fine salt particles resists percolation, and the water soon dissolves channels through the bed so that the concentration of salt in the brine not only varies but also falls well below the saturation point. For similar reasons the relatively fine evaporated salt is unsatisfactory even for the regeneration of small home water softeners of the zeolite type in which case a measured quantity of salt is simply added to the zeolite for each regeneration.

We have found that the relatively fine evaporated salt particles can be aggregated into larger dense hard particles as described hereinafter and that such aggregates form a percolation bed which is ideal for making brine under the above conditions. The larger particles permit uniform percolation throughout the bed without channeling and dissolve gradually without disintegration so that a pure sodium chloride brine of uniform saturated concentration is obtained.

The particles or aggregates should be large enough not to pass a 14-mesh screen in order to permit satisfactory percolation through the bed, but the presence of some fines is not objectionable. Subject to this limitation small aggregates, say ⅛" to ¼" in size, are preferred to large aggregates from the standpoint of efficiency since the smaller aggregates provide a greater specific surface. The shape of such aggregates is not important and they may be made in the form of tablets, spheres or spheroids, cubes or other polyhedrons, etc., according to convenience of manufacture. On the other hand, excellent results are obtainable with much larger aggregates, in which case it is preferable to employ shapes providing high specific surface values. Thus we have used aggregates having more or less the shape of a plum pit and approximately ⅜" thick, ½" wide and ⅝" long with good results, and still larger aggregates may be used particularly where factors such as high efficiency, size of apparatus, etc., are of minor importance.

Also the aggregates should have a minimum density or hardness which may be defined as a minimum specific gravity of 1.5 in comparison with the specific gravity of solid salt of about 2.16. At less than this minimum specific gravity, the aggregates may disintegrate in the percolation bed under the softening influence of the water and the weight of the bed itself, particularly when the bed is allowed to stand in water for any length of time. Such disintegration would tend to occur first in the lower part of the bed and to cause it to revert to a mass of fine salt particles subject to the objections mentioned above. On the other hand, increasing specific gravities up to the limiting value for solid salt are progressively more and more advantageous, since the danger of disintegration of individual aggregates is progressively decreased and their identity is better maintained as they become smaller and smaller.

The procedure to be employed in making salt brine from aggregates such as described above may vary widely depending on the conditions under which the brine is made and used. Reduced to its simplest terms, however, this procedure consists merely in putting the aggregates into a suitable vessel to form a bed of the desired thickness and then supplying water to the vessel and allowing it to percolate either upwardly or downwardly through the bed. About 4 cubic feet of salt bed is needed per gallon per minute of saturated brine. The salt aggregates can be supplied to the vessel by hand, from a hopper, or in any other desired manner, and either continuously or intermittently, provided only that the amount of salt in the vessel is not permitted to become too small to form saturated brine.

The water feed can also be controlled in any desired manner. When brine withdrawal takes place intermittently, a very simple method is to control the water feed by a float valve which maintains a desired liquid level in the salt-dissolving vessel. The brine outlet, preferably provided with a suitable strainer, is located on one side of the bed and the water inlet on the other side. Hence a continuously available supply of brine is maintained, whether brine is withdrawn continuously or intermittently.

In the regeneration of home water softeners, which is required only at substantial intervals, the installation of separate salt dissolving equipment is not warranted. The householder learns by direction or experience that a certain quantity of salt aggregates is needed for each regeneration and simply adds this quantity to the zeolite and circulates water until the salt is all dissolved and flushed out of the zeolite. During this period the brine circulation is of course bypassed with respect to the normal household water supply.

For operations such as that described immediately above, and for any other operation in which a supply of salt is entirely used up, it is often difficult to determine the point of exhaustion of the supply. In such cases it is highly advantageous to incorporate a dye in the aggregates and to install a sight glass at some suitable point in the brine line. Hence color shows in the sight glass as long as the salt lasts and the point of exhaustion of the salt supply can be determined by disappearance of the color.

The dye employed should produce a coloring effect of high intensity and the hue should be in contrast to the natural color of the circulating water. Also the dye should not poison the zeolite, i. e., it should not be adsorbed on the zeolite so firmly that it will not be removed by the circulating water. Also preferential solubility of the dye with respect to the salt is to be avoided, as it might result in a premature indication of salt exhaustion. On the other hand, the dye should have sufficient solubility to prevent building up residual color in the water softener after a series of regenerations. Corrosive action on the structural materials of the softener, supply lines, etc., is to be avoided, and if the softener is used with water for human consumption, the dye must be non-toxic.

Any dye that satisfies the above requirements can be used, and the choice will usually be governed by considerations of cost and availability. As examples, good results can be obtained with methylene blue and uranine.

On the other hand, where corrosion of equipment is a problem, as in operations utilizing salt brine for refrigeration, it will be found of definite advantage to incorporate a small amount of a suitable rust inhibitor such as sodium dichromate in the aggregates. It is common practice to employ rust inhibitors in brine refrigerating systems but addition of the inhibitor to the brine is usually carried out in haphazard fashion and, being an extra time consuming step, is frequently omitted altogether. Compounding the aggregates with an appropriate amount of inhibitor, about one per cent in the case of sodium dichromate, avoids these disadvantages and makes possible the simple, accurate and continuous addition of the correct amount of inhibitor during make-up of the brine supplied to the system.

In making the aggregates by compaction, relatively high pressures are required in order to reach and preferably to exceed substantially the minimum specific gravity mentioned above. However, these pressures can readily be obtained in various known types of tablet making machines, compression rolls, roll briquetting machines, etc. The refined evaporated salt, with or withoutt dye, can simply be fed to such machines to produce individual aggregates or larger masses that can be broken down to the desired size. On the other hand, it is difficult to produce very small aggregates by such machinery, and where the desired size of the aggregates is near the minimum specified above, it may be preferable to melt the salt and re-solidify it in the desired size and shape by casting or in a shot tower, etc. Such particles may be considered perfect aggregates and are of course solid salt with the maximum specific gravity of about 2.16.

The aggregates described above form a loose bed through which water percolates easily and uniformly to produce a saturated sodium chloride brine. The rate of brine production is high and the brine is crystal-clear and free of soluble impurities as well as insoluble, sludge-forming material. The aggregates do not disintegrate but merely get smaller as they dissolve while preserving their individual identity. They do not pack or arch but gradually move downwardly in the dissolving tank as the bed is replenished by adding more aggregates on top. Due to these advantages, the aggregates are ideal for use in commercial brine-making systems.

It will be understood that the invention is not restricted to the details set forth above, and that substantial variations therefrom may occur in the size and shape of the aggregates, the method of making them, the method and apparatus by which brine is made from them, and the purposes for which the brine is used. Many such variations will occur to those skilled in the art without departing from the spirit of the invention, and hence reference should be had to the appended claims for a definition of the invention.

What is claimed is:

1. The method of making pure salt brine of substantially uniform and saturated concentration by percolation which comprises forming refined evaporated salt particles into dense hard aggregates having a specific gravity of at least 1.5 and being capable of dissolving in percolating water without disintegration, said aggregates being large enough not to pass through a 14-mesh screen, and percolating water through a bed of such aggregates.

2. The method of making pure salt brine of substantially uniform and saturated concentration by percolation which comprises compacting refined evaporated salt particles under pressure into dense hard aggregates having a specific gravity of at least 1.5 and being capable of dissolving in percolating water without disintegration, said aggregates being large enough not to pass through a 14-mesh screen, and percolating water through a bed of such aggregates.

3. The method of making pure salt brine of substantially uniform and saturated concentration by percolation which comprises compacting refined evaporated salt particles under pressure into dense hard discrete particles of predetermined substantially uniform shape and large enough not to pass through a 14-mesh screen, said particles being solid throughout and having a specific gravity of at least 1.5 and being capable of dissolving in percolating water without disintegration, and percolating water through a bed of such particles.

JOSEPH AVERY DUNN.
HORACE W. DIAMOND.

References Cited in the file of this patent

UNITED STATES PATENTS

| Number | Name | Date |
|---|---|---|
| 1,459,082 | Bartlett | June 19, 1923 |
| 2,009,667 | Keyes | July 30, 1935 |
| 2,015,062 | Benjamin | Sept. 24, 1935 |
| 2,281,140 | Courthope | Apr. 28, 1942 |
| 2,412,106 | Swartz | Dec. 3, 1946 |
| 2,432,915 | Grant-Mackay | Dec. 16, 1947 |

FOREIGN PATENTS

| Number | Country | Date |
|---|---|---|
| 2,087 | Great Britain | Aug. 11, 1865 |

OTHER REFERENCES

Heating Piping and Air Conditioning, R. C. Doremus, pp. 372–376, May 1931.